United States Patent [19]

Haapala et al.

[11] Patent Number: 5,034,878

[45] Date of Patent: Jul. 23, 1991

[54] PROCEDURE FOR THE CONFIGURATION OF A BUS-TYPE DATA TRANSMISSION NETWORK

[75] Inventors: Kari Haapala, Espoo; Kari Kuosmanen, Vantaa; Lauri Mikkola; Olli Rissanen, both of Helsinki, all of Finland

[73] Assignee: Insinooritoimisto BertelEkengren Oy, Finland

[21] Appl. No.: 534,311

[22] Filed: Jun. 5, 1990

Related U.S. Application Data

[63] Continuation of Ser. No. 158,406, Feb. 22, 1988, abandoned.

[30] Foreign Application Priority Data

Mar. 2, 1987 [FI] Finland ............................. 870906

[51] Int. Cl.[5] ............................................. G06F 13/14
[52] U.S. Cl. .................................. 364/200; 364/299.4
[58] Field of Search ... 364/200 MS File, 900 MS File

[56] References Cited

U.S. PATENT DOCUMENTS

| | | | |
|---|---|---|---|
| 4,354,229 | 10/1982 | Davis et al. | 364/200 |
| 4,622,633 | 11/1986 | Ceccon et al. | 364/200 |
| 4,633,392 | 12/1986 | Vincent et al. | 364/200 |
| 4,635,192 | 6/1987 | Ceccon et al. | 364/200 |
| 4,660,141 | 4/1987 | Ceccon et al. | 364/200 |

*Primary Examiner*—Michael R. Fleming
*Assistant Examiner*—Debra A. Chun
*Attorney, Agent, or Firm*—Lorusso & Loud

[57] ABSTRACT

The invention relates to a procedure for the configuration of a bus-type data transmission network which can be connected and disconnected at any of the nodes and in which the nodes can be set for communication in either or both directions. The configuration procedure of the invention comprises the following steps:

a) initiation of configuration from a selectable node by activating the transmission of a carrier wave to all nodes, causing each node to open its switches connecting/disconnecting the data transmission lines for configuration, b) transmission of a configuration message from the selected configuring node in one or both directions along the bus to the nearest neighboring node(s), whose physical address(es) relative to the selected node (1b) are contained in the message, c) retransmission of the configuration message to the next nodes in succession, the physical address(es) of these nodes relative to the selected configuring node being contained in the message, until the whole network has been configured and all nodes have been informed of their physical location relative to the configuring station, d) distribution of the information gathered in the configuring node, containing a description of the whole data transmission network, to all nodes in the network.

8 Claims, 1 Drawing Sheet

5,034,878

PROCEDURE FOR THE CONFIGURATION OF A BUS-TYPE DATA TRANSMISSION NETWORK

This is a continuation of copending application Ser. No. 07/158,406 filed on Feb. 22, 1988.

BACKGROUND OF THE INVENTION

The present invention relates to a procedure for the configuration of a bus-type data transmission network which can be connected and disconnected at any of the nodes and in which the nodes can be set for communication in either or both directions.

In the data transmission networks known so far, different nodes are only identified as logical addresses, i.e. as types of device etc., while the physical location of the nodes is ignored.

In certain applications, particularly in local networks where the nodes typically have a low data processing capacity but are movable and may have several functions, it has been found that it is important to obtain information relating to the physical location of the nodes. Characteristically, such networks often have an open and dispersed structure and should also be insensitive to damage suffered by individual nodes and similar interruptions. Since the practical networks, especially local ones, must be simple and comply with industrial standards, the above requirements can only be met by configuring the existing networks in a suitable manner.

OBJECT OF THE INVENTION

The object of the present invention is to achieve a data transmission network in which these characteristics are combined so as to produce a very flexible local network which functions automatically and in which the physical location of the nodes is known. The procedure of the invention for configuring a data transmission network is thus characterized in that the configuration operation comprises at least the following steps:

a) Initiation of configuration from a selectable node by activating the transmission of a carrier wave to all nodes, causing each node to open its switches connecting/disconnecting the data transmission lines for configuration.

b) Transmission of a configuration message from the selected configuring node in one or both directions along the bus to the nearest node(s), whose physical address(es) relative to the selected node are contained in the message.

c) Retransmission of the configuration message to the next nodes in succession, the physical address(es) of these nodes relative to the selected configuring node being contained in the message, until the whole network has been configured and all nodes have been informed of their physical location relative to the configuring station.

d) Distribution of the information gathered in the configuring node, containing a description of the whole data transmission network, to all nodes in the network.

The most significant advantage achieved by the invention is the fact that a network thus configured meets the requirements stated above, and that normal network lines can be used for configuration, obviating the need for a separate line. The network is therefore completely open, allowing nodes to be freely added or removed.

The other advantageous embodiments of the invention are characterized by what is presented in the claims stated below.

BRIEF DESCRIPTION OF THE DRAWING

In the following, the invention is described by the aid of an example, reference being made to the drawing attached, wherein.

DETAILED DESCRIPTION OF PREFERRED EMBODIMENT

Figure 1:
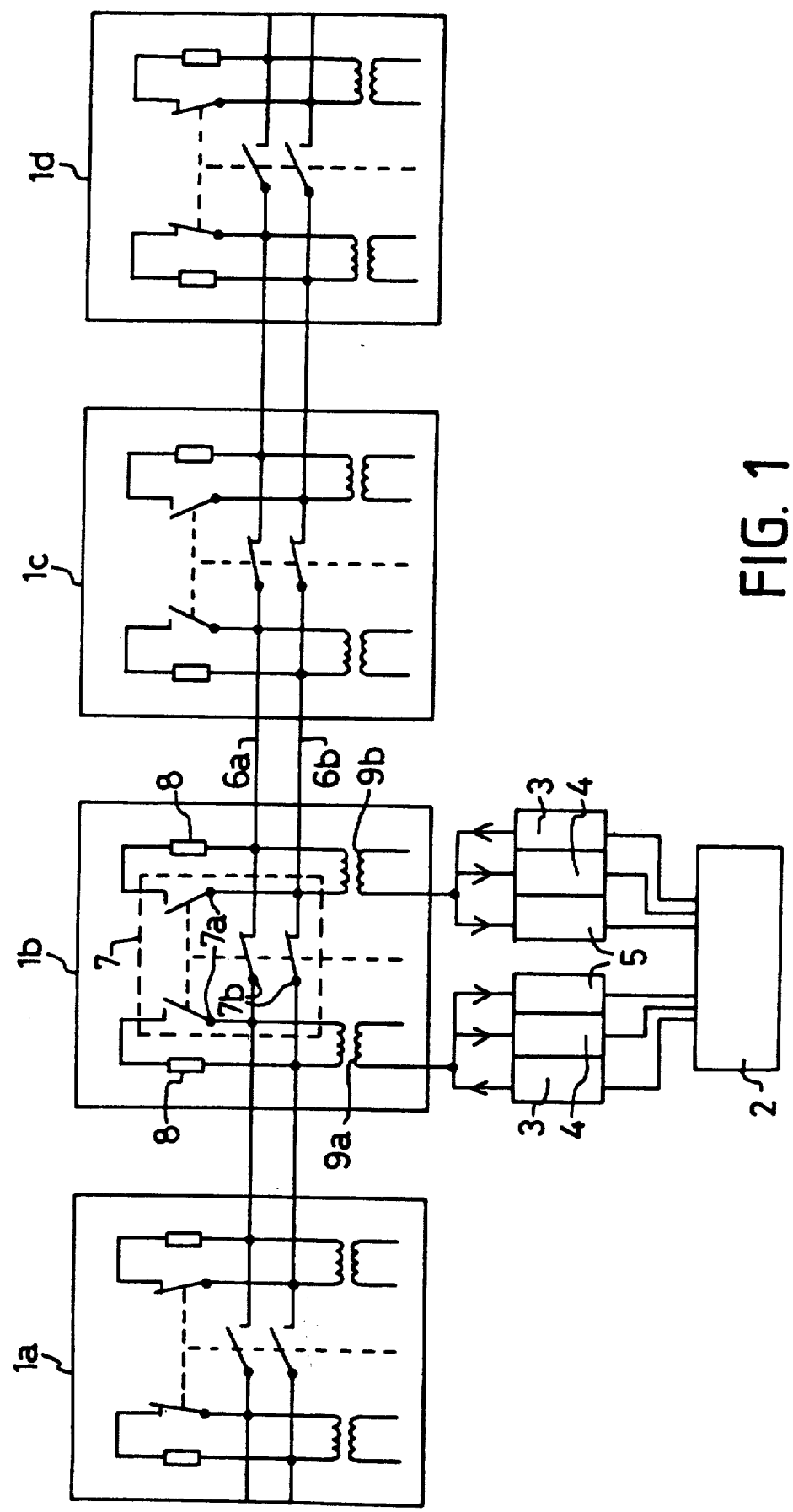
FIG. 1 is a diagram representing an example solution as provided by the invention, the network comprising four nodes.

The invention is based on a bus-type data transmission network comprising any number of nodes. In the example described below, it is assumed that the local network is implemented in a train in such manner that each carriage and the locomotive constitute a node in the network. The function of the network is to provide the information indicating where in the train each carriage or the locomotive is located, so that this information can be utilized by the conductor and other railway officials during the passage of the train on its route and especially in connection with operations at railway stations involving changes of carriages or other arrangements whereby the right carriages have to be coupled to the right locomotive. Moreover, the information on the carriages can be reported further e.g. to a national rolling stock monitoring system.

As stated above, the control of the local network is decentralized and automatic. This means that the network can be configured from any one of the carriages by the press of a button, that carriages can be freely added or removed from the trains, and that the configuration information is updated automatically by virtue of the operation of the network.

FIG. 1 shows a data transmission network built on the principle of the invention, implemented in a train comprising four nodes, i.e. a locomotive and three carriages. Each node is provided with a microcomputer 2 which is capable of ordinary data transmission within the network, and with appropriate interface circuits 3,4,5 (shown for only one node in the drawing). The programs required for the configuration of the network as provided by the invention are also stored in the microcomputer. In view of the level of complexity of the individual operations performed by the nodes, these tasks could easily be handled e.g. by a programmable logic circuit. However, since each node has to be able to cope with different tasks, e.g. configuration of the whole network, without recourse to special measures, it is naturally preferable to employ a microcomputer as the core of the logic in each node, the necessary operational programs being stored in the computer. However, as the operation of such computers belongs to the realm of conventional data transmission technology and the necessary hardware is commercially available, the computers and their operation constitute no part of the present invention and will therefore not be described in detail in this context.

The data transmission bus consists of a pair of conductors 6a and 6b, which in a normal situation constitute a continuous line extending from one end of the train to the other. The nodes are connected to the bus via a relay or a semiconductor switch 7, whose twin terminals 7a and 7b change their state simultaneously but in a mutually opposite sense, terminal resistors 8 and matching transformers 9a and 9b. The relays 7 are so connected that their contacts are always closed when the relays are in the de-energized state, so that the conductors 6a and 6b of the bus are connected as a continuous line through the whole train.

Configuration of the local network in the train, after which the user will know the location of each node in the network, is effected e.g. as follows: Configuration of a non-configured train is started e.g. by the conductor or another member of the train personnel from any one of the nodes, in our example in FIG. 1 from the node in carriage 1b. In the initial situation—differing from that in FIG. 1—the switches 7b in all nodes are closed. As explained later, FIG. 1 represents a final situation. The first step is to activate the carrier wave generator (not shown), which sends a surge of signal pulses, called a carrier-wave surge, whose duration exceeds that of the longest data message allowed in the network. The carrier wave can be identified even if the network impedances are ill-matched (no terminal resistors used). Thus the microcomputers 2 of the nodes can easily identify the carrier wave via transformers 9a or 9b by logical deduction, using carrier sensors 5. After the carrier signal has been transmitted for a time long enough to ensure that it has been registered by all nodes, the microcomputers 2 open the switches 7b, simultaneously closing the switches 7a. The carrier-wave generator is now automatically switched off.

In this way, a network is produced in which each node is only able to communicate with its "next-door" neighbors to the right and left on the line, because when switches 7b are open, the signal proceeding from transformer 9a can only go left as far as the next node, and correspondingly, the signal from transformer 9b can only go right. For successful communication between neighbors, it is of essential importance that the terminal resistors 8 be connected via switches 7a to the lines 6a and 6b. Without the terminal resistors, data can not be reliably transmitted because of interference due to reflection and other causes. Each microcomputer sends its data to the bus via a coder 3 and receives data from the bus via a decoder 4. The coding may consist in ordinary modulation or similar signal processing which increases the operational length of the network.

Next, the configuring node, in the present case carriage 1b, sends a configuration message in either direction, either via transformer 9a or transformer 9b, to the next node. If configuration is always started in the same direction, e.g. towards the rear end of the train, this provides the advantage that the carriages automatically know from which direction the configuration message arrives, so that they can easily indicate their orientation in the train e.g. by including corresponding data in their acknowledgement signal. Let us assume that the first configuration message is received by carriage 1c. The content of the message is the relative address of carriage 1c as seen from carriage 1b, i.e. the message is of the type "you are the first to the right". Carriage 1c acknowledges receipt of the message and in turn sends a message to the next node on its right, telling it e.g. "you are the second to the right". After receiving an acknowledgement signal from this neighbor, the node in carriage 1c closes its switch 7b. The process continues in the same way until the right-hand end of the bus, in this case carriage 1d, is reached. This node also tries to send a message to the right, but as no acknowledgement is received, the node sends a corresponding message along the line 6a, 6b now connected between carriages 1b and 1d. The state of the relay 7 in carriage 1d is not changed, so the terminal resistors 8 of this node remain connected. When the configuring node in carriage 1b finds that all nodes to the right have acknowledged receipt of the configuration message, the same procedure is started in the direction to the left of the configuring carriage.

Once the left-hand section of the data transmission network has been configured in a corresponding manner, the microcomputer in carriage 1b possesses complete information regarding the relative physical addresses of the locomotive and all carriages in the train. The acknowledgement signal sent by each node during configuration also contains an accurate specification of the type and number of the carriage etc. Thus, in general terms, information on both the logical and physical addresses of the nodes has been provided. As a last step in the configuration process, the "train map" now stored in the memory of the microcomputer in carriage 1b is transmitted, applying a normal procedure of local communication, in message form to all the other carriages and the locomotive, thus placing all nodes in the network into an equal position.

The invention also allows configuration of the network by a process in which the switches 7b are not closed until the end of the train has been reached. In this case the acknowledgement signal contains no identification of the carriage or the node, so that this information has to be sent either separately by each carriage or along with the acknowledgement signal sent by the last carriage, provided that the information has been accumulated in this last node. A third variant is also possible, by which the configuring carriage sends a configuration message to each carriage in turn and receives their acknowledgements. In this case, the switch 7b naturally has to be closed at the latest after receipt of the acknowledgement, so that a configuration message can be sent to the next carriage. In this configuration procedure, the node which was last configured has to observe the progress of the configuration and, if it finds that it is the last one in the network, i.e. that no acknowledgement signal is received within a given time, the node has to open its switch 7b without a separate command from the configuring carriage, because in this situation only one of the terminal resistors 8 in the network is connected, involving a degree of uncertainty in the interpretation of the message. The final acknowledgement is received as in the first alternative directly via the continuous bus established.

Further, the invention allows simultaneous configuration of the network in both directions from the configuring node. The equipment and procedures required differ in no way from those described above, but the programs needed by the microcomputers 2 are somewhat more complex. In the application described in the present example, simultaneous configuration in both directions will not bring any appreciable advantage in respect of the time consumed, but in fast data transmission networks the speed of operation has a radically different priority.

Connection of New Carriages to the Network

A non-configured carriage is passive in relation to the network. On the other hand, a configured train keeps on sending regular sensing impulses via its terminal nodes, so that it immediately recognizes the addition of a new carriage. The sensing impulses preferably consist of the carrier-wave pulse trains mentioned above. After this, the carriage that was the last one before the addition configures the network in the direction of the new carriage or carriages as explained above, whereupon the configuration information is distributed to all nodes in the network as also explained above.

When for instance two non-configured sets of carriages are coupled, the sets are initially in an equal position as both are transmitting sensing impulses. Thus the two sets of carriages are attempting to configure each other, so that this situation corresponds to the so-called Collision Detection situation in local networks. Between the attempts, the local network in each set is open to commands, and the one that first manages to send a configuration signal to the other when the latter is in this condition obtains the authority to reconfigure the whole train. The only difference is that in this case configuration is started completely automatically. These operations are not indicated in the drawing, because the configuration process itself is fully analogous to that described above.

Removal of Carriages from the Train

Removal of carriages from a train configured as provided by the invention can be effected by giving the system a corresponding message from any one of the nodes. The system reacts by releasing the relay switches 7b in the carriage which will be the last one after the removal, so that the switches 7a of this node simultaneously connect the terminal resistors 8 to the network. Carriages can also be disconnected without prior notice if the network is provided with an advanced type of diagnosing/recovery algorithm as illustrated by the following example.

Recovery

A local network implemented as provided by the invention is inherently tolerant of malfunctions for the reason alone that the network is not interrupted by a defective node, because the switches 7b are closed both during normal operation and in the de-energized state. Moreover, since each node knows the configuration of the whole network, it is possible to construct algorithms by which the nodes, relying on this physical configuration, diagnose each other. In the event of malfunction in any node, the network can be reconfigured. The result of the reconfiguration is a network in which the defective node is bypassed, because the line switches 7b of a defective node are always closed, regardless of the nature of the fault.

A diagnosing system allowing satisfactory recovery of the network even if the bus is interrupted can be implemented e.g. by providing each node with a timer which "fires" at predetermined intervals to start transmission of diagnostic messages to the terminal nodes of the network. If the messages are acknowledged, the network is in order. If not, the node registers the direction of the fault, opens its bus contact 7b and waits for diagnostic impulses from the fault direction. If it receives any, the node will know that it is not the last active node in the direction towards the defective one and closes its bus contact 7b, thus charging the next node with the task of locating the fault. Finally, one of the nodes will find that no diagnostic impulses are received from the direction in question within a given time, so that this node will know that it is the last one in working order in the direction towards the fault. The node concerned then automatically becomes the terminal node of the network in that direction.

Following the same algorithm, the section of the network beyond the defective node is also configured, the result being two networks in working order, with the defective node between them.

It is obvious to a person skilled in the art that the invention is not restricted to the example described above, and that the embodiments of the invention may instead be varied within the scope of the following claims.

We claim:

1. Procedure for the configuration of a linear bus-type data transmission network, said linear network comprising a plurality of identical nodes and a pair of data transmission lines between each of said plurality of identical nodes, said plurality of identical nodes being capable of communication in either direction along the network, said plurality of identical nodes also having two states selectable by switches within said plurality of identical nodes, in a first of said states an individual node of said plurality of identical nodes connects the transmission lines from nodes adjacent to said indvidual node thus allowing communication between said adjacent nodes through said individual node, and in a second of said states said individual node of said plurality of identical nodes does not connect said transmission lines from adjacent nodes and said individual node communicates separately with each of said adjacent nodes, thus creating discrete node pairs, each of said node pairs comprising one of said adjacent nodes and said individual node, said configuration procedure comprising at least the following steps:

a) initiating configuration from one of said plurality of identical nodes selected to be the starting point of said configuration by activating the transmission of a carrier wave to the plurality of identical nodes other than the selected node, causing each of the nodes other than the selected node to switch to said second state thus creating node pairs throughout said network;

b) transmitting a configuration message from said selected node in either or both directions along the data transmission lines to at least one node which is next along the linear network, said message containing the physical address, relative to the selected node, of the node which is next along the linear network;

c) repeating transmission of the configuration message to the plurality of identical nodes in succession along the data transmission lines of the network, the physical address, relative to said selected node, of each of said plurality of nodes being updated and contained in the message, until the network has been configured and all of said plurality of nodes have been informed of their physical location relative to said selected node; and d) transmitting network configuration information gathered in said selected node, containing a description of the whole data transmission network, to all of said plurality of identical nodes in the network.

2. Procedure according to claim 1, wherein the configuration of said network is implemented in such manner that a first node in a given direction of the network to which said configuration message is sent by said selected node acknowledges receipt of said message and in turn transmits a corresponding configuration message to a next node in the same direction and, after receiving an acknowledgment from the next node in the same direction, switches to said first state, thus allowing data transmission between said next node in the same direction and said selected node.

3. Procedure according to claim 1, wherein nodes which have received said configuration message only switch to said first state after said network configuring information has been transmitted to all nodes in said network.

4. Procedure according to claim 1, wherein the configuration of said network is implemented in such a manner that said selected node itself transmits said configuration messages successively to each of said plurality of identical nodes along said network and also receives all of said acknowledgment signals, the receipt of said acknowledgment signals causing said selected node to successively cause each of said plurality of identical nodes to switch to said first state receipt of the acknowledgment.

5. Procedure according to claim 1, wherein one or more non-configured nodes are added to a configured network having end nodes, said end nodes forming the physical ends of said network and being in said second state and having terminating resistors in a direction away from said network such that transmission line reflections are rejected, the addition of said one or more non-configured nodes is effected without reconfiguring the network by an arrangement in which said end nodes regularly send carrier waves such as those used during configuration, said added one or more non-configured nodes sending an acknowledgment signal in response to said carrier wave whereupon said end node to which the non-configured nodes have been added reconfigures the network with respect to the added nodes, whereupon all nodes of the network are informed of the new configuration.

6. Procedure according to claim 5, wherein when two configured networks are added together, the end nodes of the networks will try to configure each other by sending a carrier wave as used during configuration to serve as a configuration signal whereby one of the configured networks will send a configuration signal that will be received by the other of said configured networks before the other of said networks attempts to send a similar signal, the receipt of said configuration signal serving to establish said sending network as the network that will configure the other of said networks and reconfigure the whole network thus formed.

7. Procedure according to claim 1, where a fault monitoring arrangement is employed in which each node in one of said networks regularly sends diagnostic messages to other nodes in said network to check whether acknowledgment signals from each of said other nodes are received.

8. The procedure as set forth in claim 1, wherein in step (b) said configuration message is first transmitted in a first direction along said linear data network and after steps (c) and (d) are carried out, said configuration message is then transmitted in a second direction opposite to said first direction along said linear data network followed by the repetition of steps (c) and (d).

* * * * *